United States Patent
Cai et al.

(10) Patent No.: US 10,127,442 B2
(45) Date of Patent: Nov. 13, 2018

(54) NON-SEQUENTIAL COMPARISON OF DOCUMENTS

(71) Applicant: INTERNATIONAL BUSINESS MACHINES CORPORATION, Armonk, NY (US)

(72) Inventors: Ke Ke Cai, Beijing (CN); Hong Lei Guo, Beijing (CN); Zhi Li Guo, Beijing (CN); Feng Jin, Beijing (CN); Yong Qin, Beijing (CN); Zhong Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/177,728

(22) Filed: Jun. 9, 2016

(65) Prior Publication Data
US 2017/0357852 A1    Dec. 14, 2017

(51) Int. Cl.
| | |
|---|---|
| *G06K 9/68* | (2006.01) |
| *G06K 9/00* | (2006.01) |
| *G06K 9/62* | (2006.01) |
| *G06F 17/27* | (2006.01) |

(52) U.S. Cl.
CPC ..... *G06K 9/00483* (2013.01); *G06F 17/2785* (2013.01); *G06K 9/00469* (2013.01); *G06K 9/6215* (2013.01)

(58) Field of Classification Search
None
See application file for complete search history.

(56) References Cited

U.S. PATENT DOCUMENTS

| | | | | |
|---|---|---|---|---|
| 6,810,376 | B1 * | 10/2004 | Guan | G06F 17/2785 704/9 |
| 2013/0054612 | A1 | 2/2013 | Danielyan et al. | |
| 2016/0196342 | A1 * | 7/2016 | Kim | G06F 17/30728 707/728 |

OTHER PUBLICATIONS

Hatem Ghorbel, et al.," ROSETTA: Rhetorical and semantic environment for text alignment",Proceedings of Corpus Linguistics, Lancaster, Researchgate, 2001, p. 1-10.
Veronica Agostini et al.,"Automatic Alignment of News Texts and their Multi-document Summaries: Comparison among Methods", Computational Processing of the Portuguese Language, vol. 8775, Computer Science, Springer, p. 1-12, 2014.

* cited by examiner

*Primary Examiner* — Sumati Lefkowitz
*Assistant Examiner* — David Perlman
(74) *Attorney, Agent, or Firm* — Cantor Colburn LLP; Vazken Alexanian

(57) ABSTRACT

Embodiments of the present disclosure relate to non-sequential document comparison. A first plurality of segments in a first document and a second plurality of segments in a second document are obtained. In response to a first segment from the first plurality of segments being associated with a second segment from the second plurality of segments, a third segment from the first plurality of segments is associated with a fourth segment from the second plurality of segments.

17 Claims, 8 Drawing Sheets

| DOCUMENT 1 | DOCUMENT 2 |
|---|---|
| [001] The scale and the distinctness of the appended drawings shall be such that a reproduction with a linear reduction in size to two-thirds would still enable all details to be clearly distinguished. | [001] The scale and the distinctness of the appended drawings shall be such that a reproduction with a linear reduction in size to two-thirds would still enable all details to be clearly distinguished. |
| | [002]Appended drawing reference signs not mentioned in the text of the specification of the invention or utility model shall not appear in the appended drawings. Appended drawing reference signs not appearing in the appended drawings shall not be mentioned in the text of the specification. |
| [002] The appended drawing reference signs for the same composite part used in the application documents shall be consistent throughout. | [003] The appended drawing reference signs for the same composite part used in the application documents shall be consistent throughout. |
| [003] Appended drawing reference signs not mentioned in the text of the specification of the invention or utility model shall not appear in the appended drawings. Appended drawing reference signs not appearing in the appended drawings shall not be mentioned in the text of the specification. | |

Fig. 2A

| | DOCUMENT 1 | DOCUMENT 2 | |
|---|---|---|---|
| 212 | [001] The scale and the distinctness of the appended drawings shall be such that a reproduction with a linear reduction in size to two-thirds would still enable all details to be clearly distinguished. | [001] The scale and the distinctness of the appended drawings shall be such that a reproduction with a linear reduction in size to two-thirds would still enable all details to be clearly distinguished. | 222 |
| 214 | [002] The appended drawing reference signs for the same composite part used in the application documents shall be consistent throughout. | | |
| 216 | [003] Appended drawing reference signs not mentioned in the text of the specification of the invention or utility model shall not appear in the appended drawings. Appended drawing reference signs not appearing in the appended drawings shall not be mentioned in the text of the specification. | [002] Appended drawing reference signs not mentioned in the text of the specification of the invention or utility model shall not appear in the appended drawings. Appended drawing reference signs not appearing in the appended drawings shall not be mentioned in the text of the specification. | 224 |
| | | [003] The appended drawing reference signs for the same composite part used in the application documents shall be consistent throughout. | 226 |

Fig. 2B

| DOCUMENT 1 | DOCUMENT 2 |
|---|---|
| [001] The scale and the distinctness of the appended drawings shall be such that a reproduction with a linear reduction in size to two-thirds would still enable all details to be clearly distinguished. | [001] The same sheet of appended drawings may contain several figures of the invention or utility model, and the figures shall be numbered and arranged in numerical order consecutively as "Figure 1, Figure 2...". |
| [002] The appended drawing reference signs for the same composite part used in the application documents shall be consistent throughout. | [002] Appended drawing reference signs not mentioned in the text of the specification of the invention or utility model shall not appear in the appended drawings. Appended drawing reference signs that are not appearing in the appended drawings shall not be mentioned in the text of the specification. |
| [003] Appended drawing reference signs not mentioned in the text of the specification of the invention or utility model shall not appear in the appended drawings. Appended drawing reference signs not appearing in the appended drawings shall not be mentioned in the text of the specification. | [003] The appended drawing reference signs for the same composite part used in the application documents shall be consistent throughout. |

Fig. 3A

| DOCUMENT 1 | DOCUMENT 2 |
|---|---|
| [0 0 1] The scale and the distinctness of the appended drawings shall be such that a reproduction with a linear reduction in size to two-thirds would still enable all details to be clearly distinguished. | |
| [002] The appended drawing reference signs for the same composite part used in the application documents shall be consistent throughout. | [003] The appended drawing reference signs for the same composite part used in the application documents shall be consistent throughout. |
| [0 0 3] Appended drawing reference signs not mentioned in the text of the specification of the invention or utility model shall not appear in the appended drawings. Appended drawing reference signs not appearing in the appended drawings shall not be mentioned in the text of the specification. | [0 0 2] Appended drawing reference signs not mentioned in the text of the specification of the invention or utility model shall not appear in the appended drawings. Appended drawing reference signs t h a t  a r e not appearing in the appended drawings shall not be mentioned in the text of the specification. |

Fig. 3B

| DOCUMENT 1 | DOCUMENT 2 |
|---|---|
| [001] The scale and the distinctness of the appended drawings shall be such that a reproduction with a linear reduction in size to two-thirds would still enable all details to be clearly distinguished. | [001] The same sheet of appended drawings may contain several figures of the invention or utility model, and the figures shall be numbered and arranged in numerical order consecutively as "Figure 1, Figure 2...". |
| [002] ①The appended drawing reference signs for the same composite part used in the application documents shall be consistent throughout. | [002] ①Appended drawing reference signs not mentioned in the text of the specification of the invention or utility model shall not appear in the appended drawings. ②Appended drawing reference signs that are not appearing in the appended drawings shall not be mentioned in the text of the specification. |
| [003] ①Appended drawing reference signs not mentioned in the text of the specification of the invention or utility model shall not appear in the appended drawings. ②Appended drawing reference signs not appearing in the appended drawings shall not be mentioned in the text of the specification. | [003] ①The appended drawing reference signs for the same composite part used in the application documents shall be consistent throughout. |

Fig. 4

NON-SEQUENTIAL COMPARISON OF DOCUMENTS

BACKGROUND

Document comparison is aimed at identifying differences and/or correspondences between two or more electronic documents. In many use cases, a source document could be edited by several authors. Different authors may add, delete, or rewrite some portions of the document and create different new versions. Document comparison will help with finding out how similar the different versions are to each other and associating the same or similar portions of the versions with each other. Some authors or other users may then be able to recognize different and/or similar portions of the different versions based on the associating result. In other use cases, a user may simply want to compare two or more entirely different documents, for example, from different sources or created by different parties.

SUMMARY

Example embodiments of the present disclosure provide a method, a device, and a computer program product for comparing documents.

In an aspect, a computer-implemented method is provided. According to the method, a first plurality of segments in a first document and a second plurality of segments in a second document are obtained. In response to a first segment from the first plurality of segments being associated with a second segment from the second plurality of segments, a third segment from the first plurality of segments is associated with a fourth segment from the second plurality of segments. The associating includes: comparing the third segment with the fourth segment to determine a first similarity level, the third and fourth segments satisfying one of the following: the third segment being a segment following the first segment and the fourth segment being a segment prior to the second segment, and the third segment being a segment prior to the first segment and the fourth segment being a segment following the second segment; and associating the third segment with the fourth segment based on the first similarity level.

In another aspect, a device is provided. The device includes a processing unit and a memory coupled to the processing unit and storing instructions thereon. The instructions can be executed by the processing unit to perform acts including obtaining a first plurality of segments in a first document and a second plurality of segments in a second document and in response to a first segment from the first plurality of segments being associated with a second segment from the second plurality of segments, associating a third segment from the first plurality of segments with a fourth segment from the second plurality of segments. The associating includes: comparing the third segment with the fourth segment to determine a first similarity level, the third and fourth segments satisfying one of the following: the third segment being a segment following the first segment and the fourth segment being a segment prior to the second segment, and the third segment being a segment prior to the first segment and the fourth segment being a segment following the second segment; and associating the third segment with the fourth segment based on the first similarity level.

In yet another aspect, a computer program product is provided. The computer program product is tangibly stored on a non-transient machine-readable medium and comprises machine-executable instructions. When executed on a device, the instructions cause the device to obtain a first plurality of segments in a first document and a second plurality of segments in a second document and in response to a first segment from the first plurality of segments being associated with a second segment from the second plurality of segments, associate a third segment from the first plurality of segments with a fourth segment from the second plurality of segments. The associating includes: comparing the third segment with the fourth segment to determine a first similarity level, the third and fourth segments satisfying one of the following: the third segment being a segment following the first segment and the fourth segment being a segment prior to the second segment, and the third segment being a segment prior to the first segment and the fourth segment being a segment following the second segment; and associating the third segment with the fourth segment based on the first similarity level.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 2A is an example result of sequential comparison of two documents;

FIG. 2B is another example result of sequential comparison of two documents;

FIG. 3A is an example result of non-sequential comparison of two documents in accordance with some embodiments of the present disclosure;

FIG. 3B is another example result of non-sequential comparison of two documents in accordance with some embodiments of the present disclosure;

FIG. 4 is an example result of non-sequential comparison of two documents in accordance with another embodiment of the present disclosure.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Figure 1:
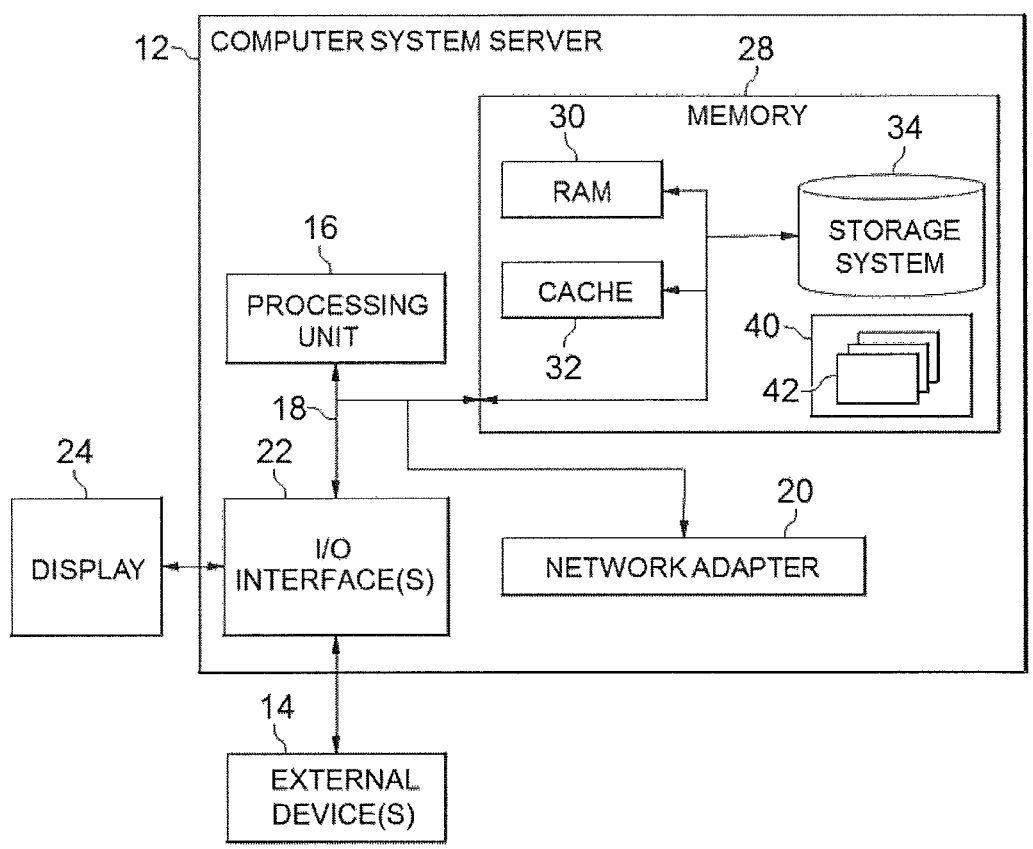
FIG. 1 is a block diagram of an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein. Computer system/server 12 may be referred to herein as a processor system or a processor circuit.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

As mentioned above, it is desirable to compare different electronic documents to identify the same or similar portions contained therein. Contents in documents are recited in a sequential order. Conventionally, document comparison is done by comparing segments of two documents according to the sequential order of the segments and aligning the segments with a high similarity. Specifically, a first segment in a first document is compared with a second segment in a second document. When the first and second segments can be aligned with each other due to their high similarity level, according to the sequential order, a third segment following the first segment in the first document is continued to be compared with a fourth segment following the second segment in the second document.

In the conventional sequential comparison, only segments following the already aligned segments are considered, and the segments in the two documents are compared one by one in a sequential order until similar segments are found and aligned. For example, when the fourth segment is different from the third segment, a fifth segment following the fourth segment in the second document will be used to compare with the third segment to determine their similarity level. However, the sequential comparison may result in missing of similar segments. For example, if the second document includes a segment having a high similarity with the third segment but being located before the second segment, there is no opportunity for this segment to be compared with the third segment of the first document. In some other cases where the first document includes a segment having a high similarity with the fourth segment but being located before the first segment, there is also no opportunity for this segment to be compared with the fourth segment.

FIGS. 2A and 2B show some example results of sequential comparison of two documents 210 and 220. As shown, during the document comparison, the first paragraph 212 of the document 210 is first compared with the first paragraph 222 of the document 220. Because these two paragraphs recite the same contents, they can be aligned with each other as shown. By following the sequential order, the second paragraph 214 following the first paragraph 212 in the document 210 is then compared with the second paragraph 224 following the first paragraph 222 in the document 220 and their similarity level is determined as a very low level.

In the example shown in FIG. 2A, the second paragraph 224 will be marked as a new paragraph added in the edited version 220. The second paragraph 214 is continued to be compared with the third paragraph 226 of the document 220 which follows the first and second paragraphs 222 and 224. It is determined that the similarity of the two paragraphs 214 and 226 is high. Thus, the paragraph 214 is aligned with the paragraph 226. Subsequently, the third paragraph 216 following the paragraph 214 in the document 210 is taken into account. However, because no paragraph following the aligned paragraph 226 in the document 220 is found, the paragraph 216 may be marked as having been removed from the edited version 220.

In the example shown in FIG. 2B, when the similarity level between the paragraph 214 and the paragraph 224 is determined to be a low level, the paragraph 214 may be marked as having been removed from the document 220. Subsequently, the third paragraph 216 following the marked paragraph 214 is compared with the paragraph 224 which has not yet been aligned with any paragraph in the document 210. The paragraphs 216 and 224 may be aligned with each other due to their high similarity. In a similar way, the paragraph 226 following the paragraph 224 may be marked as a new paragraph added in the document 220 because no paragraph following the paragraph 216 is found in the document 210.

It can be seen from the above examples that the conventional sequential document comparison is sensitive to the change of content order. Although the second and third paragraphs 224 and 226 only have their relative positions switched in the document 220 but still recite the same contents, any of the sequential comparison results shows that there are substantial changes from the document 210 to the document 220. In FIG. 2A, the paragraph 224 has no opportunity to be compared and aligned with the paragraph 216 because according to the sequential comparison, the comparing result of the paragraph 224 should be determined before the following paragraph 226 is concerned. As soon as the paragraph 226 is determined to be aligned with the paragraph 214 in the document 210, the paragraphs prior to the paragraph 214 or 226 will not be compared with other paragraphs. Similarly, in the example of FIG. 2B, the paragraph 214 in the document 210 has no opportunity to be compared and aligned with the paragraph 226 in the document 220. The undesirable results shown in FIGS. 2A and 2B are mainly caused by the strict sequential comparison of the paragraphs.

When editing a document, different authors usually organize the contents in the document in different ways, for example, to make them read more smoothly, to emphasize some important points at the beginning or ending of the document, or simply for personal preference. These may occur in the case where contents of the document have a certain text structure. Examples of this kind of documents include, but are not limited to, essays, news, academic papers, legal documents such as contracts or agreements, and the like. In these cases, applying the sequential comparison to identify the same or similar segments from different documents might give undesirable results, preventing the user from recognizing differences and/or correspondences between various document versions correctly. In other use cases, a user may want to find out if there are any similar segments in different documents with limited similarity, especially in the term of order. The sequential document comparison may also give undesirable results.

According to embodiments of the present disclosure, instead of following a strict sequential order of document comparison, segments of a document can be compared with segments of another document in a non-sequential manner. First, a respective plurality of segments is obtained in each of two documents to be compared, for example, a first document and a second document. When a first segment in the first document is determined to be associated with a second segment in the second document, a third segment following the first segment in the first document may be compared with a fourth segment prior to the second segment in the second document and a similarity level between the third and fourth segments may be determined. Alternatively, or in addition, a third segment prior to the first segment in the first document may also be compared with a fourth segment following the second segment in the second document so as to determine a similarity level. In some embodiments, when there are two or more pairs of associated segments located before or after the third and fourth segments, the third and fourth segments may also be selected to compare with each other. Therefore, even when one or more pairs of associated segments are identified, segments located before the associated segments in one document may also be used to compare with segments located after the corresponding associated segment in the other document to determine whether they are similar to each other.

In some embodiments, a segment in the first document may be compared with each of some or all of the segments of the second document without considering the sequential order of the segments. For example, the third segment may be compared with each of the segments in the second document as well as the fourth segment to determine their similarity level. In these cases, it is possible to find all of the same or similar segments in different documents even the order of the segments is modified. In one embodiment, the segment of the first document located at the beginning of this document may be compared with the first segment and/or any other segments of the second document to determine their similarity levels. Similarly, the last segment in one of the first and second documents may also be compared with each of some or all of the segments in the other document to determine their similarity level.

The first and second documents to be compared may be stored in any machine readable formats. In some embodiments, the segments may be extracted from the first and second documents based on a same granularity. As used herein, the term "granularity" refers to the level at which a document is divided. The first and second documents may be divided in a coarse or fine manner based on the selected granularity. In some embodiments, the granularity may be selected from a group consisting of: a part, a chapter, a section, a clause, a paragraph, and a sentence. The documents may also be divided into textual segments with any length. The boundaries of different segments in the documents may be identified based on the punctuation marks, key terms (for example, "chapter," "section"), or any other information indicating the segments with a specific granularity in the documents. In some other embodiments, the segments may be obtained from the first document and the second document based on different granularities.

A similarity level between two segments to be compared may be measured so as to determine if the two segments can be associated with each other. The determination of the similarity level will be discussed in more detail below. In some embodiments, the similarity level may be compared with a threshold level. The threshold level may be a default value or may be configured or modified by the user. If the similarity level exceeds the threshold level, it is determined that the segment of the first document is associated with the segment of the second document. The threshold level may be set to any reasonable value. If it is desired to identify segments with high similarity from the documents, the threshold level may be determined as a high value. Otherwise, the threshold level may be set as a middle or small value. The association results may be presented to the user so that the user can recognize the differences and/or correspondences of the two documents.

There are many ways to measure a similarity level between two segments. In some embodiments, the similarity of two segments may be determined at least partially based on the count of words shared by those two segments. It would be appreciated, however, that two segments may be similar to one another in terms of semantic meanings though the common words shared by the segments are not too many. To deal with this situation, in some embodiments, instead of or in addition to the count of common words, the similarity level may be determined based on the semantic similarity between the two segments. Any suitable approaches, either currently known or to be developed in the future, may be applied to measure semantic similarity between two segments. Examples of such approaches include, but are not limited to, unigram, bigram, trigram, negation and exception rules, semantic equivalences (for example, an abbreviation and its full name), and the like.

Alternatively, or in addition, domain information of the documents where two segments are contained may also be used to determine the similarity level between the segments. Domain information may indicate the category of the documents (essays, news, academic papers, or legal documents such as contracts or agreements) and the structural information included in these documents which may be used to categorize the segments. Generally speaking, two segments in the same or similar domains or categories may have a high possibility to include the same or similar contents. For example, segments in the clauses of charge and payment may share some similar information. In some embodiments, the segments containing the same domain information may be determined to have a high similarity level.

In some embodiments, when the similarity level between two segments is determined to be high (for example, higher than a threshold level), the two segments may be determined to be associated with each other. In some cases, although the similarity level determined by taking the segments as a whole is high, some of the sub-segments included in those segments may distinguish from each other (for example, have different semantic meanings). In order to present more accurate results of comparison, in some embodiments, the similarity level(s) between one or more pairs of the sub-segments in the two segments may be used to adjust the similarity level between the segments. In these embodiments, the segments may be further divided into sub-segments based on a finer granularity. For example, if two documents are first compared with each other based on a granularity of paragraphs, then paragraphs in the documents may be further divided into sub-segments based on a finer granularity of sentences.

In some embodiment, when the initially determined similarity level between the two segments (for example, determined based on the domain information or the common words in the segments) is higher than a threshold level, the similarity level(s) between the sub-segments may be determined and used to adjust the similarity level between the segments. In some other embodiments, the similarity level between the sub-segments may be used directly to determine the similarity level between the segments.

In one embodiment, when the similarity levels between the sub-segments exceed a threshold level, the similarity level between the segments may be increased, for example, by a predetermined value. The threshold level for the sub-segments may be the same or different from the threshold level for the segments. In one example, if a large number of sub-segments in the two segments are determined to have high similarity levels (for example, higher than the corresponding threshold level), and then the similarity level for the segments may be increased. Alternatively, when the similarity levels between the sub-segments are lower than the corresponding threshold level (for example, a large number of sub-segments in one segment have lower similarity levels with sub-segments in the other segment), the similarity level between the segments may be decreased, for example, by a predetermined value. The determination of the similarity level between sub-segments will be discussed in more detail below.

In some embodiments, the sub-segments in the two associated segments may be compared with each other in a non-sequential manner. In this case, a sub-segment in the first segment may be compared with any sub-segment in the second segment so as to identify the same or similar sub-segments from the two segments. Similar to the non-sequential comparison of segments, it is also possible to determine one-to-multiple or multiple-to-one associations of sub-segments. Alternatively, the sub-segments may be compared with each other in a sequential manner. In some embodiments, when the adjusted similarity level between the two segments is still higher than the corresponding threshold level, the segments may be determined as being associated with each other.

FIG. 3A shows an example result of non-sequential comparison of two documents, documents 310 and 320. In the example of FIG. 3, the documents 310 and 320 are first divided into paragraphs. Based on a non-sequential order, the first paragraph 312 from the paragraphs of the document 310 is compared with not only the first paragraph 322 but also all other paragraphs from in the document 320, including the second paragraph 324 and the third paragraph 326, to determine respective similarity levels. Because the similarity level between the first paragraph 312 and each of the paragraphs 322-326 is small, the first paragraph 312 is not associated with any paragraph in the document 320.

The second paragraph 314 in the document 310 is also compared with each paragraph among the first paragraph to the third paragraph 322 to 326 of the document 320 to measure the respective similarity level. It is determined in this example that the similarity level between the second paragraph 314 and the third paragraph 326 is higher than the threshold level and thus the paragraphs 314 and 326 can be associated with each other. According to embodiments of the present disclosure, the third paragraph 316 following the document 310 can be compared with a paragraph prior to the corresponding paragraph 326, for example, the paragraph 322 or 324 in the document 320. In the example of FIG. 3A, the third paragraph 316 is determined to be associated with the second paragraph 324 due to their high similarity level.

It would be appreciated that if there are additional paragraphs following the paragraph 326 in the document 320, the paragraph 316 may also be compared with each of some or all of those paragraphs. It would also be appreciated that in some cases the paragraph 316 and the paragraph 324 may be first determined to be associated with each other. In these cases, the paragraph 326 following the paragraph 324 may also be compared with paragraphs prior to the paragraph 316, for example, the segments 312 and 314 as well as paragraphs following the paragraph 316 (if any). In some embodiments, the comparison of the paragraphs may be performed in any order. For example, the second paragraph 314 may be first selected to be compared with any of the paragraphs in the document 320, and then other paragraphs in the document 310 may be considered.

In some embodiments, the association of two segments may be indicated to the user in a variety of ways. In some embodiments, the associated segments may be marked with an indicator. For example, as shown in FIG. 3A, the associated paragraphs 314 and 326 are marked with the same type of dashed blocks, and the associated paragraphs 316 and 324 are marked with another type of dotted blocks. Alternatively, or in addition, other visual indicators may be also used to indicate the association of two segments. For example, the associated segments may be highlighted with colors, underlines, or shadows, may be linked with a line or an arrow, and/or the like.

In some embodiments, two associated segments may be aligned with each other so as to indicate their association and to facilitate the user to recognize and identify the correspondence of the two segments quickly. By way of example, the two associated segments may be displayed in adjacent locations of the display screen. FIG. 3B shows such an example result of document comparison. As shown, the associated paragraphs 314 and 326 are aligned with each other and the associated paragraphs 316 and 324 are aligned with each other. In the example shown in FIG. 3B, the paragraph 312 is not aligned with any paragraph because no associated paragraph is found in the document 320.

Figure 3C:
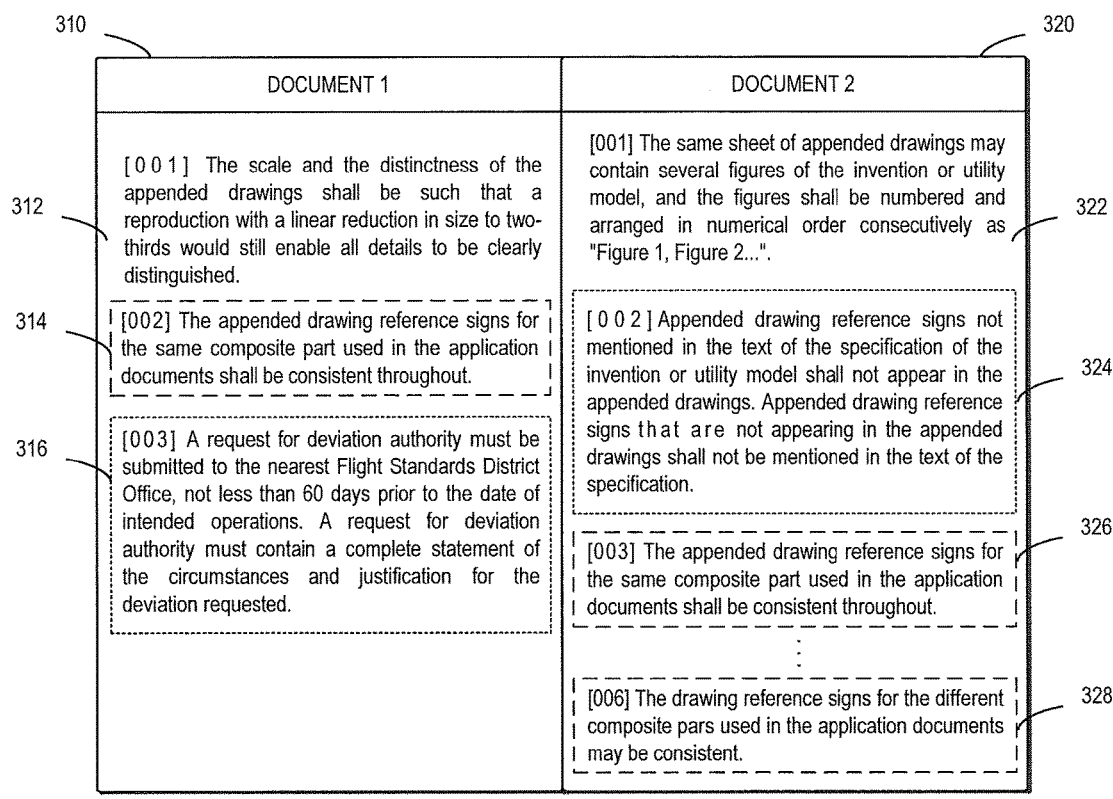
FIG. 3C is another example result of non-sequential comparison of two documents in accordance with some embodiments of the present disclosure.

In some embodiments, because a segment in the first document can be compared with any segments in the second document, it is possible to obtain one-to-multiple association of segments. In these embodiments, if the similarity level between a segment in the first document and each of two or more segments in the second documents is higher than the threshold level, the segment in the first document may be associated with all of the two or more segments. An example of one-to-multiple association is shown in FIG. 3C. By measuring the similarity levels of the paragraphs, it is determined that the second paragraph 314 in the document 310 is associated with both the third paragraph 326 and the sixth paragraph 328 in the document 320. The same indication of dashed block is used to indicate the association of the three segments. Of course, when the similarity levels between each of two or more segments in the first document and one segment in the second document is determined to be higher than the threshold level, multiple-to-one association can be obtained.

In some embodiments, it is desired to determine whether there are any associated sub-segments included in two associated segments (a first segment and an associated second segment, for example). A first sub-segment in the first segment may be compared with a second sub-segment in the associated second segment to determine a similarity level. As mentioned above, sub-segments in one segment may be compared with sub-segments in the other segments according to a sequential order or non-sequential order. The similarity level may be compared with a threshold level. If the determined similarity level exceeds the threshold level, the first sub-segment may be associated with the second sub-segment. The threshold level for the sub-segments may be the same or different from the threshold level for the segments.

In some embodiments, the similarity level between two sub-segments may be measured in a rough way and/or the corresponding threshold level may be set to a low value, while the similarity level between two sub-segments may be measured in a precise way and/or the corresponding threshold level may be set to a high value. In some embodiments, the similarity levels between sub-segments included in two segments may be measured first and then used to determine or adjust the similarity level between the two segments.

In one embodiment, the similarity between two sub-segments (for example, two sentences) may be measured based on the distribution of similar snippets included therein. The snippets may be identified by searching one or more common seed terms within each of the sub-segments and extending from the seed terms in both directions word-by-word to a certain length. The seed terms may be obtained from some predetermined domain databases or provided by the user. If an identified snippet of a sub-segment includes a small number of words that are different from those included in the snippet of the other sub-segment, the two sub-segments may be determined to having a high similarity level. It would be appreciated that any other suitable approaches can be applied to determine the similarity level between the sub-segments.

In some embodiments, the resulting association of sub-segments may also be presented to the user so that the user can recognize the difference and correspondence of the sub-segments in the documents. There are many ways to indicate the association of two sub-segments to the user. FIG. 4 shows an example result of sub-segment comparison. In the example of FIG. 4, the associated paragraphs 314 and 326 or associated paragraphs 316 and 324 are divided into sentences. A sentence in one paragraph is compared with any of the sentences in the associated paragraph to determine the respective similarity levels. As shown, an indicator 401 is used to indicate the association of two or more sentences in the associated paragraphs. Similar to the associations of segments, other visual indications such as colors, shadows, or links, may also be used to indicate the association. Alternatively, or in addition, a sub-segment may be aligned with the associated sub-segment in the embodiments where the corresponding segments are aligned with each other.

It would be appreciated that in some embodiments, the associated sub-segments may be further divided into smaller textual portions based on a further finer granularity and similarity between the smaller portions may be determined to identify the same or similar portions in the associated sub-segments. That is to say, the correspondences of documents may be determined based on multi-granularity comparison, so that textual portions of both large and fine granularities that contain similar contents in the documents can be identified.

Figure 5:
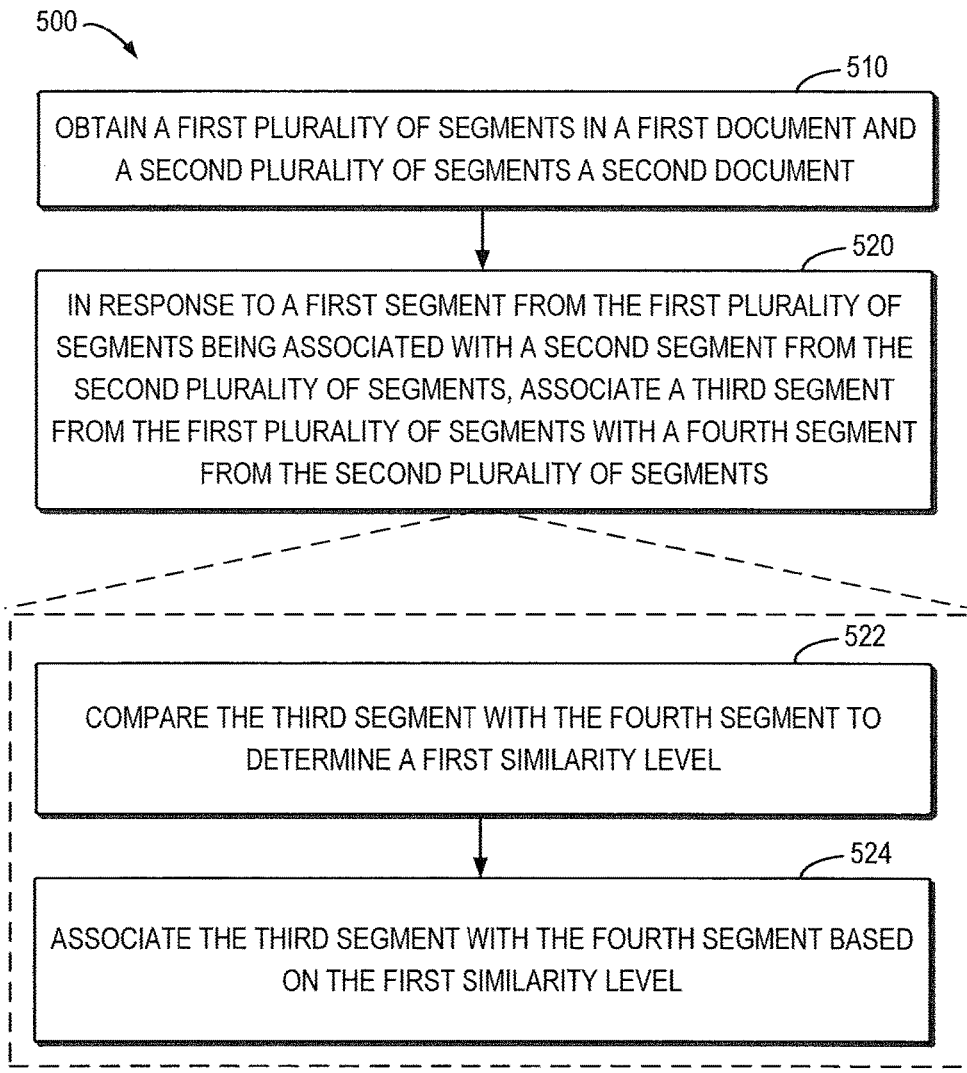
FIG. 5 is a flowchart of a method for comparing documents in accordance with embodiments of the present disclosure.

FIG. 5 shows a flowchart of a method 500 for comparing documents in accordance with embodiments of the present disclosure. The method 500 can be carried out by the electronic device or computer system 12 as shown in FIG. 1, for example. In step 510, a first plurality of segments (for example, the paragraphs 312, 314, and 316) in a first document (for example, the document 310) and a second plurality of segments (for example, the paragraphs 322, 324, 326, and 328) in a second document (for example, the document 320) are obtained. In step 520, in response to a first segment (for example, the paragraph 314) from the first plurality of segments being associated with a second segment (for example, the paragraph 326) from the second plurality of segments, a third segment (for example, the paragraph 316) from the first plurality of segments is associated with a fourth segment (for example, the paragraph 324) from the second plurality of segments.

The step 520 includes two sub-steps 522 and 524. In sub-step 522, the third segment is compared with the fourth segment to determine a first similarity level. The third and fourth segments satisfy one of the following: the third segment being a segment following the first segment and the fourth segment being a segment prior to the second segment, and the third segment being a segment prior to the first segment and the fourth segment being a segment following the second segment. In sub-step 524, the third segment is associated with the fourth segment based on the first similarity level.

In some embodiments, in response to the first similarity level exceeding a threshold level, a second similarity level between a first sub-segment in the third segment and a second sub-segment in the fourth segment may be determined. The first similarity level may be adjusted based on the second similarity level. In response to the adjusted first similarity level exceeding the threshold level, the third segment may be associated with the fourth segment.

In some embodiments, in response to the second similarity level exceeding a further threshold level, the first similarly level may be increased. In some embodiments, in response to the second similarity level being below the further threshold level, the first similarity level may be decreased.

In some embodiments, in response to the first similarity level exceeding a threshold level, a second similarity level between a first sub-segment in the third segment and a second sub-segment in the fourth segment may be determined. In response to the second similarity level exceeding a further threshold level, the first sub-segment may be associated with the second sub-segment.

In some embodiments, the third segment may be compared with each of the second plurality of segments other than the fourth segment to determine a third similarity level. In some embodiments, in response to the third similarity level between the third segment and a fifth segment from the second plurality of segments exceeding a threshold level, the third segment may be associated with the fifth segment.

In some embodiments, the first and second plurality of segments may be obtained based on a same granularity. The granularity may be selected from a group consisting of a part, a chapter, a section, a clause, a paragraph, and a sentence.

In some embodiments, the first similarity level may be determined based on at least one of the following: semantic similarity between the first segment and the second segment or domain information of the first document and the second document.

In some embodiments, in response to the third segment being associated with the fourth segment, the third and fourth segments may be marked with an indicator. Alternatively, or in addition, in response to the third segment being associated with the fourth segment, the third segment may be aligned with the fourth segment.

It would be appreciated that embodiments of the present disclosure apply non-sequential comparison to different electronic documents. The non-sequential comparison can identify similar textual portions from the documents regardless the order they are recited in, which may be suitable for comparing documents edited by adjusting the order only or with limited similarity, especially for comparing documents with fixed text structures. Because a portion in a document can be compared with any portions in another document in a non-sequential manner, it is also feasible to obtain one-to-multiple or multiple-to-one association of all similar textual portions in the documents. Moreover, the comparison of documents may be performed on basis of multiple granularities so as to identify the same or similar textual portions with different lengths. This will facilitate the user to recognize differences and/or correspondences between coarse and fine textual portions in the documents.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, using a processor system, a first plurality of segments in a first electronic document and a second plurality of segments in a second electronic document; and
in response to a first segment from the first plurality of segments being associated with a second segment from the second plurality of segments, associating, using the processor system, a third segment from the first plurality of segments with a fourth segment from the second plurality of segments, the associating including:
comparing, using the processor system, the third segment with the fourth segment to determine a first similarity level, the third and fourth segments satisfying one of the following:
the third segment being a segment following the first segment and the fourth segment being a segment prior to the second segment; and
the third segment being a segment prior to the first segment and the fourth segment being a segment following the second segment; and
associating, using the processor system, the third segment with the fourth segment based on the first similarity level, wherein associating the third segment with the fourth segment comprises:
in response to the first similarity level exceeding a threshold level, determining a second similarity level between a first sub-segment in the third segment and a second sub-segment in the fourth segment;
adjusting the first similarity level based on the second similarity level;
in response to the adjusted first similarity level exceeding the threshold level, associating the third segment with the fourth segment; and
displaying the third segment and the fourth segment in adjacent locations of a display screen.

2. The method of claim 1, wherein adjusting the first similarity level based on the second similarity level comprises:
in response to the second similarity level exceeding a further threshold level, increasing the first similarly level; and in response to the second similarity level being below the further threshold level, decreasing the first similarity level.

3. The method of claim 1, further comprising:

in response to the first similarity level exceeding a threshold level, determining a second similarity level between a first sub-segment in the third segment and a second sub-segment in the fourth segment; and in response to the second similarity level exceeding a further threshold level, associating the first sub-segment with the second sub-segment.

4. The method of claim 1, further comprising:

comparing the third segment with each of the second plurality of segments other than the fourth segment to determine a third similarity level; and in response to the third similarity level between the third segment and a fifth segment from the second plurality of segments exceeding a threshold level, associating the third segment with the fifth segment.

5. The method of claim 1, wherein the obtaining comprises:

obtaining the first and second plurality of segments based on a same granularity, the granularity being selected from a group consisting of a part, a chapter, a section, a clause, a paragraph, and a sentence.

6. The method of claim 1, wherein the first similarity level is determined based on at least one of the following:

semantic similarity between the third and fourth segments; and domain information of the first and second electronic documents.

7. The method of claim 1, wherein in response to the third segment being associated with the fourth segment, the method further comprises at least one of the following:

marking the third and fourth segments with an indicator; and aligning the third segment with the fourth segment.

8. A device comprising:

a processing unit;

a memory communicatively coupled to the processing unit and storing instructions thereon, the instructions, when executed by the processing unit, performing acts including:

obtaining a first plurality of segments in a first electronic document and a second plurality of segments in a second electronic document; and in response to a first segment from the first plurality of segments being associated with a second segment from the second plurality of segments, associating a third segment from the first plurality of segments with a fourth segment from the second plurality of segments;

wherein the associating includes:

comparing the third segment with the fourth segment to determine a first similarity level, the third and fourth segments satisfying one of the following: the third segment being a segment following the first segment and the fourth segment being a segment prior to the second segment, and the third segment being a segment prior to the first segment and the fourth segment being a segment following the second segment; and associating the third segment with the fourth segment based on the first similarity level, wherein associating the third segment with the fourth segment comprises:

in response to the first similarity level exceeding a threshold level, determining a second similarity level between a first sub-segment in the third segment and a second sub-segment in the fourth segment;

adjusting the first similarity level based on the second similarity level; and in response to the adjusted first similarity level exceeding the threshold level, associating the third segment with the fourth segment; and displaying the third segment and the fourth segment in adjacent locations of a display screen.

9. The device of claim 8, wherein adjusting the first similarity level based on the second similarity level comprises:

in response to the second similarity level exceeding a further threshold level, increasing the first similarly level; and in response to the second similarity level being below the further threshold level, decreasing the first similarity level.

10. The device of claim 8, wherein associating at least some of the first plurality of segments with at least some of the second plurality of segments further comprises:

in response to the first similarity level exceeding a threshold level, determining a second similarity level between a first sub-segment in the third segment and a second sub-segment in the fourth segment; and in response to the second similarity level exceeding a further threshold level, associating the first sub-segment with the second sub-segment.

11. The device of claim 8, wherein the acts further include:

comparing the third segment with each of the second plurality of segments other than the fourth segment to determine a third similarity level; and in response to the third similarity level between the third segment and a fifth segment from the second plurality of segments exceeding a threshold level, associating the third segment with the fifth segment.

12. The device of claim 8, wherein the obtaining comprises:

obtaining the first and second plurality of segments based on a same granularity, the granularity being selected from a group consisting of a part, a chapter, a section, a clause, a paragraph, and a sentence.

13. The device of claim 8, wherein the first similarity level is determined based on at least one of the following:

semantic similarity between the third and fourth segments; and domain information of the first and second electronic documents.

14. The device of claim 8, wherein in response to the third segment being associated with the fourth segment, the acts further include:

marking the third and fourth segments with an indicator; and aligning the third segment with the fourth segment.

15. A computer program product being tangibly stored on a non-transient machine-readable medium and comprising machine-executable instructions, the instructions, when executed on a device, causing the device to:

obtain a first plurality of segments in a first electronic document and a second plurality of segments in a second electronic document; and in response to a first segment from the first plurality of segments being associated with a second segment from the second plurality of segments, associate a third segment from the first plurality of segments with a fourth segment from the second plurality of segments;

wherein the associating includes:
comparing the third segment with the fourth segment to determine a first similarity level;
wherein the third and fourth segments satisfy one of the following:
the third segment being a segment following the first segment and the fourth segment being a segment prior to the second segment; and
the third segment being a segment prior to the first segment and the fourth segment being a segment following the second segment, and
associating the third segment with the fourth segment based on the first similarity level, wherein associating the third segment with the fourth segment comprises:
in response to the first similarity level exceeding a threshold level, determining a second similarity level between a first sub-segment in the third segment and a second sub-segment in the fourth segment;
adjusting the first similarity level based on the second similarity level; and
in response to the adjusted first similarity level exceeding the threshold level, associating the third segment with the fourth segment; and displaying the third segment and the fourth segment in adjacent locations of a display screen.

16. The computer program product of claim 15, wherein the instructions, when executed on the device, cause the device to:
in response to the first similarity level exceeding a threshold level, determine a second similarity level between a first sub-segment in the third segment and a second sub-segment in the fourth segment; and
in response to the second similarity level exceeding a further threshold level, associate the first sub-segment with the second sub-segment.

17. The computer program product of claim 15, wherein the instructions, when executed on the device, cause the device to:
compare the third segment with each of the second plurality of segments other than the fourth segment to determine a third similarity level; and
in response to the third similarity level between the third segment and a fifth segment from the second plurality of segments exceeding a threshold level, associate the third segment with the fifth segment.

* * * * *